United States Patent
Park et al.

(10) Patent No.: US 9,363,826 B2
(45) Date of Patent: Jun. 7, 2016

(54) WIRELESS DEVICE AND METHOD FOR WIRELESS CHANNEL ACCESS

(75) Inventors: Minyoung Park, Portland, OR (US); Eldad Perahia, Portland, OR (US); Thomas J Kenney, Portland, OR (US); Emily H. Qi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 129 days.

(21) Appl. No.: 13/993,857

(22) PCT Filed: Dec. 29, 2011

(86) PCT No.: PCT/US2011/067886
§ 371 (c)(1),
(2), (4) Date: Sep. 3, 2013

(87) PCT Pub. No.: WO2013/009347
PCT Pub. Date: Jan. 17, 2013

(65) Prior Publication Data
US 2015/0036567 A1   Feb. 5, 2015

Related U.S. Application Data

(60) Provisional application No. 61/505,722, filed on Jul. 8, 2011.

(51) Int. Cl.
| | |
|---|---|
| H04W 74/00 | (2009.01) |
| H04W 52/02 | (2009.01) |
| H04L 27/26 | (2006.01) |
| H04W 74/08 | (2009.01) |

(52) U.S. Cl.
CPC ......... *H04W 74/002* (2013.01); *H04L 27/2613* (2013.01); *H04W 52/0225* (2013.01); *H04W 74/08* (2013.01)

(58) Field of Classification Search
None
See application file for complete search history.

(56) References Cited

U.S. PATENT DOCUMENTS

| | | | |
|---|---|---|---|
| 2006/0256709 A1* | 11/2006 | Yang | 370/206 |
| 2006/0269024 A1 | 11/2006 | Dominique et al. | |

(Continued)

FOREIGN PATENT DOCUMENTS

| | | |
|---|---|---|
| CA | 2773663 A1 | 3/2011 |
| CN | 103828468 A | 5/2014 |

(Continued)

OTHER PUBLICATIONS

"International Application Serial No. PCT/US2011/067886, International Search Report mailed May 30, 2012", 3 pgs.

(Continued)

*Primary Examiner* — Hassan Phillips
*Assistant Examiner* — Saba - Tsegaye
(74) *Attorney, Agent, or Firm* — Schwegman Lundberg & Woesnner, P.A.

(57) ABSTRACT

Disclosed in some examples is a method of channel access by a wireless device in a wireless network by determining whether there is network traffic associated with a preamble of a first type and whether there is network traffic associated with a preamble of a second type, wherein the wireless device is not capable of decoding the preamble of the second type, and wherein determining that there is network traffic associated with a preamble of the second type includes determining that an energy level of the channel is above a threshold for a period of time, the first and second preamble types being different lengths; and sending a packet with a preamble of the first type, responsive to determining that no network traffic is detected associated with the preamble of the second type or network traffic associated with a preamble of the first type for the period of time.

21 Claims, 4 Drawing Sheets

(56) References Cited

U.S. PATENT DOCUMENTS

| | | |
|---|---|---|
| 2009/0103564 A1 | 4/2009 | Lee et al. |
| 2011/0310880 A1* | 12/2011 | Nieto et al. ............ 370/350 |
| 2012/0294294 A1* | 11/2012 | Zhang .................... 370/338 |

FOREIGN PATENT DOCUMENTS

| | | |
|---|---|---|
| KR | 1020060068422 A | 6/2006 |
| WO | WO-2005018180 A1 | 2/2005 |
| WO | WO-2009074949 A2 | 6/2009 |
| WO | WO-2013009347 A1 | 1/2013 |

OTHER PUBLICATIONS

"International Application Serial No. PCT/US2011/067886, Written Opinion mailed May 30, 2012", 4 pgs.

"European Application Serial No. 11869365.4, Extended European Search Report mailed Feb. 23, 2015", 7 pgs.

"International Application Serial No. PCT/US2011/067886, International Preliminary Report on Patentability mailed Jan. 23, 2014", 6 pgs.

* cited by examiner

WIRELESS DEVICE AND METHOD FOR WIRELESS CHANNEL ACCESS

PRIORITY CLAIM

This application is a U.S. National Stage Filing under 35 U.S.C. 371 from International Patent Application Serial No. PCT/US2011/067886, filed Dec. 29, 2011, published on Jan. 17, 2013 as WO 2013/009347 A1, which claims priority to U.S. Provisional Patent Application Ser. No. 61/505,722, filed Jul. 8, 2011, both of which are incorporated herein by reference in their entirety.

TECHNICAL FIELD

Embodiments pertain to wireless communications. Some embodiments relate to methods of channel access of wireless communications systems.

BACKGROUND

As a result of increased demand for wireless devices with low duty cycles which transmit small amounts of data infrequently over large distances (e.g., smart sensors in remote locations), new efforts are emerging that attempt to develop standards for these devices based on existing wireless technologies and protocols. For example, the proposed IEEE 802.11ah specification specifies a wireless protocol for the sub 1 GHz frequency spectrum based on the 802.11 family of standards. The 802.11ah proposal will enable small battery powered wireless devices (e.g., sensors) to use Wi-Fi (IEEE 802.11) to connect to the Internet with very low power consumption. The 802.11ah proposal introduces a set of modulation and coding schemes (MCS0-8) with low data rates of between 0.8125 and 10.8375 Mbps. The 802.11ah standard also introduces a set of optional physical data rates lower then MCS0. These low data rate schemes of 0.203 Mbps and 0.406 Mbps extend transmission range by transmitting the packet multiple times sequentially using the lowest standard MCS (MCS0). The receiver may then combine the multiple copies of the packet to realize increased processing gains. While transmission range is increased, the rate is decreased (because of the need to transmit the packet multiple times—i.e. by transmitting the packet twice, the data rate is lowered from 0.8125 to 0.406 Mbps).

Each packet sent over a wireless network contains a preamble portion which allows another wireless device to recognize the packet and train its receiver to decode the packet. When the packet is duplicated for purposes of the lower physical rates, the preamble must also be duplicated so as to be detectable at the receiver. Thus some wireless protocols feature two different length preambles—a standard preamble and a long preamble for the low physical rates. Despite the fact that these lower physical rates are considered "optional," because many wireless protocols (including 802.11) often utilize media access control (MAC) schemes such as carrier sense multiple access (CSMA) (in which a wireless device must sense that the channel is clear for a predefined time period prior to transmitting data over the medium), wireless devices must be able to recognize the longer preamble packets to determine if the channel is in use or not. As multiple preambles of disparate length are utilized, the receiver design complexity increases as the receiver must be trained to recognize additional preamble signatures. This in turn increases cost as additional circuitry will be required to detect the unique signature of each preamble length.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Disclosed in some examples are methods, apparatuses, and machine readable media which reduce wireless design complexity for wireless protocols which utilize multiple preambles of different length. In some examples, rather than having the devices look for specific preamble signatures, the devices may utilize an energy level threshold. The devices may monitor the energy level on the channel for the particular duration of time described by the wireless protocol specification, and if the detected energy level is below a particular threshold level (e.g., −62 dBm) for the entire duration of time, the wireless device may conclude that the wireless channel is clear to send a packet.

Table 1 shows example MCS and PHY data rates for the IEEE 802.11ah proposed specification. The IEEE 802.11ah proposed specification is currently in progress but is defined in "Proposed specification framework for TGah," doc.:IEEE 802.11-11/1137r3 by Minyoung Park. These MCS and PHY data rates may be derived by eight-times down clocking the 802.11ac MCS table.

TABLE 1

MCS AND PHY RATES

| MCS Index | Modulation | R | 6.4 us GI | 3.2 us GI |
|---|---|---|---|---|
| 0 | BPSK | 1/2 | .8125 | .9 |
| 1 | QPSK | 1/2 | 1.625 | 1.8 |
| 2 | QPSK | 3/4 | 2.4375 | 2.7125 |
| 3 | 16-QAM | 1/2 | 3.25 | 3.6125 |
| 4 | 16-QAM | 3/4 | 4.875 | 5.4125 |
| 5 | 64-QAM | 2/3 | 6.5 | 7.225 |
| 6 | 64-QAM | 3/4 | 7.3125 | 8.125 |
| 7 | 64-QAM | 5/6 | 8.125 | 9.025 |
| 8 | 256-QAM | 3/4 | 9.75 | 10.8375 |
| 9 | | | MCS 9 is invalid | |

Figure 1:
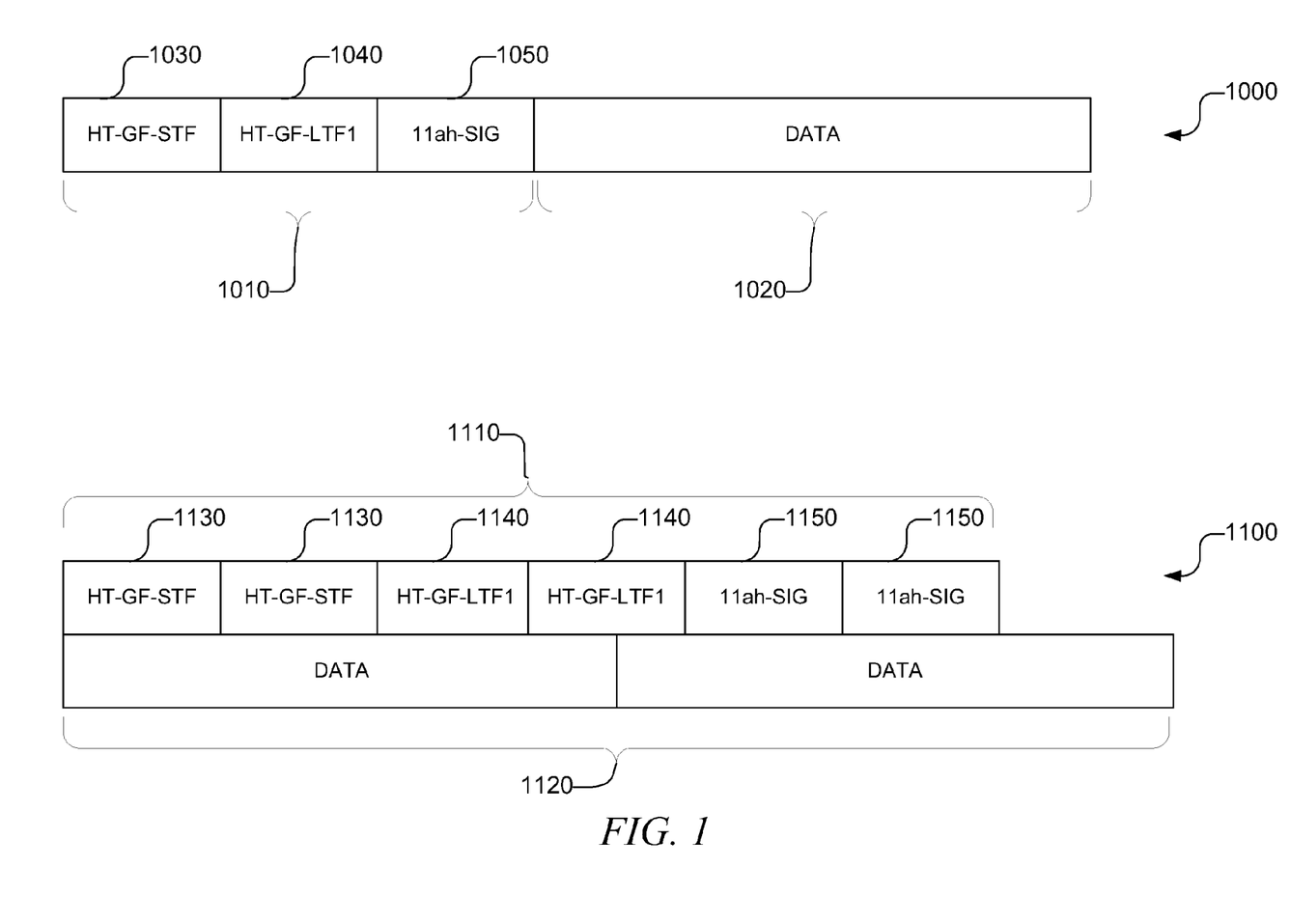
FIG. 1 is diagram of a short and long preamble according to some examples of the present disclosure.

FIG. 1 shows an example of a data packet (e.g., PPDU) 1000 starting with a preamble 1010 followed by a data field 1020. The preamble contains the HT-GF-STF (High Throughput Greenfield Short Training Field) 1030, the HT-GF-LTF1 (High Throughput Greenfield Long Training Field) 1040, and the 11ah-SIG field (SIGNAL) 1050. The data field is modulated and coded using one of the MCS' listed in table 1. The SIG field 1050 of the preamble identifies the MCS used to encode data field 1020, the duration of the packet, and other information. Since the preamble used for MCS0-MCS8 is shorter than preamble 1100 (also FIG. 1, discussed below), the preamble 1010 will be referred to as a short preamble.

In addition to the MCS' in TABLE 1, optional PHY rates lower than MCS0 may also be used to extend transmission range. This may be accomplished by repeating the preamble and the data of the packet by a predetermined number of times. For example, by a single repetition of the preamble and the data packet of MCS0, the data rate is decreased to 0.406 Mbps. The benefit is that the receiver sensitivity is lowered 3 dB because the receiver may combine each successively received data block. This single duplication is referred to as MCS0-R2. MCS0-R4 is a quadrupling of the data packet which results in a data rate decreased to 0.203 Mbps and a receiver sensitivity lowering by 6 dB. Because the data rate is so low, the preamble must also be doubled or quadrupled in order for a receiver to properly decode the packet.

Continuing with FIG. 1, an MCS0-R2 packet 1100 is shown. This packet consists of long preamble 1110 and repeated data packets 1120. The long preamble 1110 includes repeated HT-GF-STF 1130, HT-FG-LTF1 1140 and 11ah-SIG 1150 fields. Preamble 1110 may be referred to as long preamble.

As already noted, detecting multiple different lengths of preambles creates additional complexity in the circuit design of receivers as they need to be able to detect these added length packets in order to sense the medium properly. This applies even if the device does not support these lower data rates.

By utilizing the energy detection schemes of the present disclosure, a device may implement logic to decode only one of the various length preambles utilized in the wireless protocol. Thus the devices may save complexity by not implementing additional decoding logic for the other preambles. These energy detection techniques monitor the wireless channel for a predetermined period of time. If the energy detected during that period is greater than a threshold level for the entire period, the wireless device assumes that a data packet is on the medium.

The threshold level may be derived from the minimum receiver sensitivity of the lowest MCS. In some examples, the minimum receiver sensitivity may be calculated, and then a margin of error may be added to that. For example, for the 20 MHz bandwidth, the lowest MCS with BPSK ½ coding rate, the receiver sensitivity is −82 dBm. For smaller channel bandwidths, the sensitivity is smaller. For example, for a 2 MHZ channel, the receiver sensitivity would be equal to −82 dBm-10 log 10(20/2)=−92 dBm. The energy detection threshold may include a margin of error, for example, 20 dB. Thus the threshold may be set 20 dB higher than the minimum receiver sensitivity. For example, for the 20 MHZ channel BW, the energy detection threshold may be −82 dBm+20 dB=−62 dBm and for the 2 MHZ channel bandwidth, the energy detection threshold becomes −92 dBm+20 dB=−72 dBm.

While this technique may fail to detect some packets (as some packets may be received at energy levels below the threshold), this risk is likely to be minimal. This is because the devices likely to employ the low rate physical schemes are low duty-cycle devices in remote areas. Assuming the medium utilization is low (as would be expected in a remote location), the wireless medium is likely to be free most times. Therefore the chances of a packet being in the air, much less a packet below the energy level threshold would be rare. Thus, collisions in this environment caused by a wireless device which only supports the standard preamble and substitutes the energy detection scheme in place of supporting the long preamble would be rare. Furthermore, even using receivers which detect both preambles (both long and short) in such an environment is no guarantee that the packet will be detected due to the long sleep cycles of these devices. For example, a device just waking up is just as likely to wake up after the preamble is already passed (and when the data is being transmitted) as it is to wake up in time to read the preamble. Even if the device detects both preambles, since the device woke up after the preamble passed, the device would not see the packet and may transmit data, causing a collision.

Figure 2:
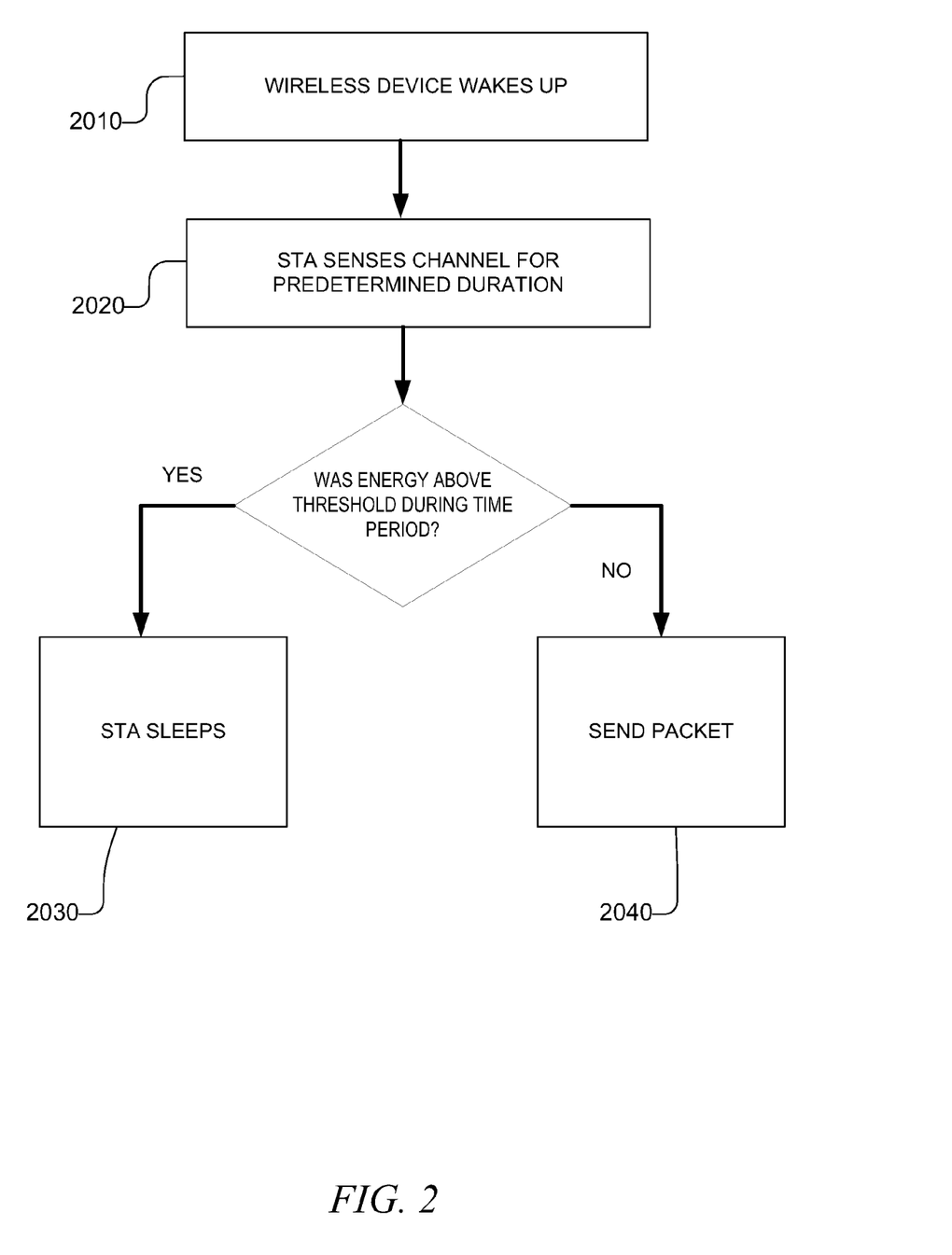
FIG. 2 is a flow chart of a method of channel access according to some examples of the present disclosure.

Turning now to FIG. 2, a method of channel access according to some examples of the present disclosure is shown. At operation 2010 the wireless device (e.g., a station or STA) wakes up from a sleep cycle. At operation 2020 the wireless device senses the channel for a predetermined duration. In some examples, this predetermined duration may be a duration defined by the MAC layer of the wireless protocol for sensing that the channel is clear prior to sending (e.g., for IEEE 802.11—a distributed coordination function interframe space—DIFS). If the energy is above a predetermined threshold level for the entire predetermined duration, then the station determines that the channel is busy and may go back to sleep at 2030. In some examples, the duration that the wireless device goes back to sleep may be random. If the energy is below the predetermined threshold level for the entire predetermined duration, then the station may transmit any data it has to send at operation 2040.

Figure 3:
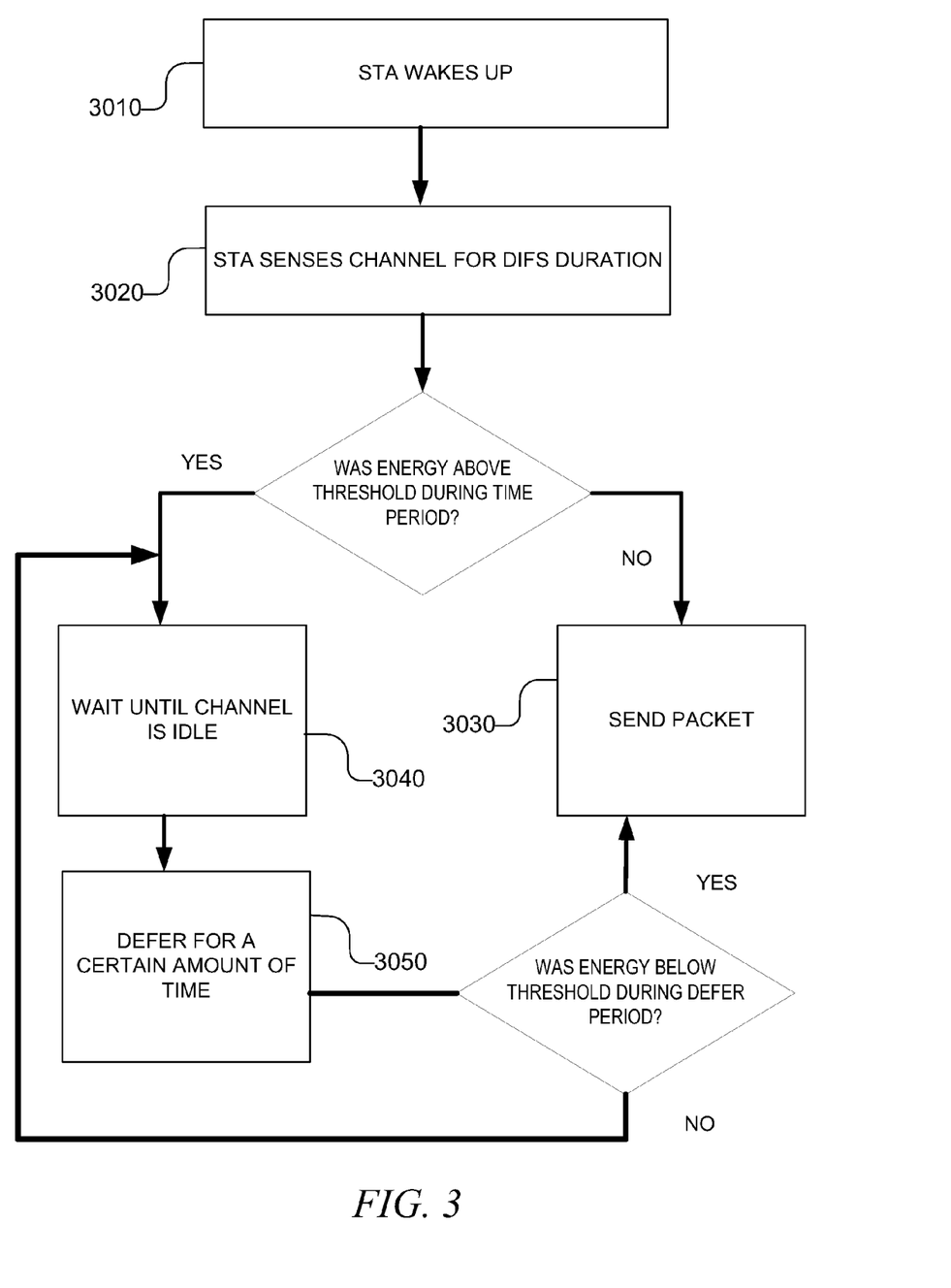
FIG. 3 is a flowchart of a method of channel access according to some examples of the present disclosure.
Figure 4:
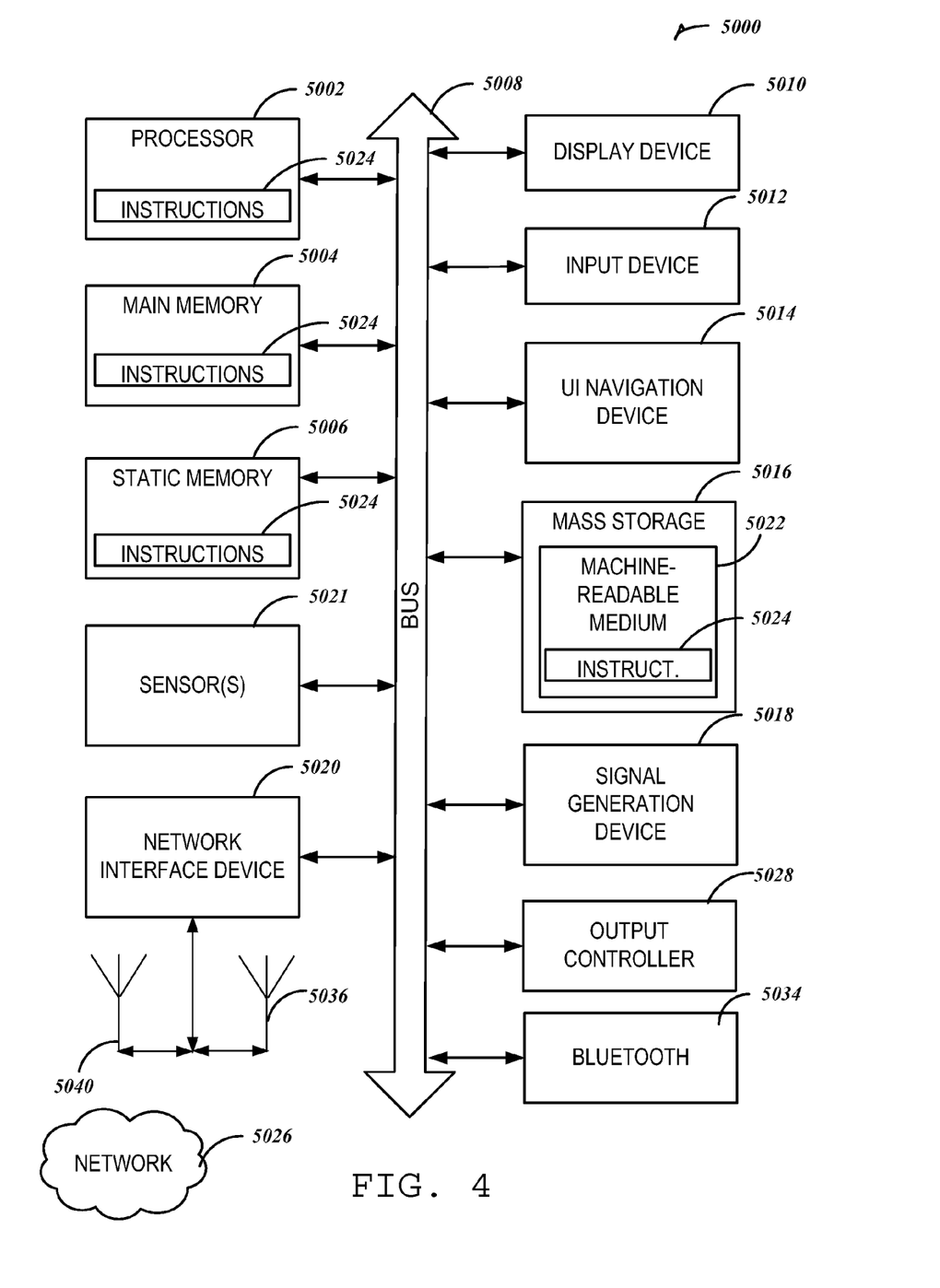
FIG. 4 is a schematic of a machine according to some examples of the present disclosure.

Turning now to FIG. 3, another method of channel access according to some examples of the present disclosure is shown. At operation 3010 the wireless device wakes up from a sleep cycle. At operation 3020 the wireless device senses the channel for a predetermined duration. In some examples, this predetermined duration may be a duration defined by the MAC layer of the wireless protocol for sensing that the channel is clear prior to sending (e.g., for IEEE 802.11—a distributed coordination function interframe space—DIFS). If the energy is not above the predetermined threshold level for the entire predetermined duration, then the station may transmit any data it has to send at operation 3030. If the energy was above the threshold duration during the time period, then the wireless station may wait until the channel is idle at operation 3040 and defer for a second predetermined time period (e.g., DIFS+a backoff period) at operation 3050. If the energy level was below the threshold for the defer time period, then the packet is sent at operation 3030. If the energy level was not below the threshold for the defer time period, the station repeats steps 3040 and 3050.

If the wireless device is waiting for a response packet from another wireless device or a wireless access point, and the wireless device is not capable of decoding the long preamble, the station may stay awake and scan the channel waiting for the response packet. If the wireless station is capable of decoding the long preamble, then the station may either stay awake and wait for the response frame or the station may decode the duration information in the SIG field of the preamble and go back to sleep until the frame has passed (to save power).

In the specification, the IEEE 802.11ah draft specification was used as examples of wireless protocols which may benefit from Applicants' disclosure. 802.11ah is an Orthogonal Frequency Division Multiplexing (OFDM) wireless protocol. One skilled in the art with the benefit of Applicants' disclosure will appreciate that any other wireless protocol which makes use of preambles of differing lengths may utilize the energy detection scheme proposed. Furthermore, while the examples above measured the energy for the entire period and compared it to the threshold level, in other examples, the wireless device may utilize an average. Thus if an average energy level was below a threshold then the wireless device may conclude that the wireless medium is free.

FIG. 5 illustrates a block diagram of an example machine 5000 upon which any one or more of the techniques (e.g., methodologies) discussed herein can be performed. In alternative embodiments, the machine 5000 can operate as a standalone device or can be connected (e.g., networked) to other machines. In a networked deployment, the machine 5000 can operate in the capacity of a server machine, a client machine, or both in server-client network environments. In an example, the machine 5000 can act as a peer machine in peer-to-peer (P2P) (or other distributed) network environment. The machine 5000 can be a wireless device which implements the methods described herein, a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. For example, the functions of the machine 5000 can be distributed across multiple other machines in a network.

Examples, as described herein, can include, or can operate on, logic or a number of components, modules, or mechanisms. Modules are tangible entities capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software (e.g., instructions, an application portion, or an application) as a module that operates to perform specified operations. In an example, the software can reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor can be configured as one or more modules that can change over time. Software can accordingly configure a hardware processor, for example, to constitute a particular module at one instance of time and to constitute a different module at a different instance of time.

Machine (e.g., computer system) 5000 can include a hardware processor 5002 (e.g., a central processing unit (CPU), a graphics processing unit (GPU), a hardware processor core, or any combination thereof), a main memory 5004 and a static memory 5006, some or all of which can communicate with each other via a bus 5008. The machine 5000 can further include a display unit 5010, an alphanumeric input device 5012 (e.g., a keyboard), and a user interface (UI) navigation device 5011 (e.g., a mouse). In an example, the display unit 5010, input device 5017 and UI navigation device 914 can be a touch screen display. The machine 5000 can additionally include a storage device (e.g., drive unit) 5016, a signal generation device 5018 (e.g., a speaker), a network interface device 5020, and one or more sensors 5021, such as a global positioning system (GPS) sensor, compass, accelerometer, or other sensor. The machine 5000 can include an output controller 5028, such as a serial (e.g., universal serial bus (USB), parallel, or other wired or wireless (e.g., infrared(IR)) connection to communicate or control one or more peripheral devices (e.g., a printer, card reader, etc.).

The storage device 5016 can include a machine-readable medium 5022 on which is stored one or more sets of data structures or instructions 5024 (e.g., software) embodying or utilized by any one or more of the techniques or functions described herein. The instructions 5024 can also reside, completely or at least partially, within the main memory 5004, within static memory 5006, or within the hardware processor 5002 during execution thereof by the machine 5000. In an example, one or any combination of the hardware processor 5002, the main memory 5004, the static memory 5006, or the storage device 5016 can constitute machine readable media.

While the machine-readable medium 5022 is illustrated as a single medium, the term "machine readable medium" can include a single medium or multiple media (e.g., a centralized or distributed database, and/or associated caches and servers) that configured to store the one or more instructions 5024.

The term "machine-readable medium" can include any tangible medium that is capable of storing, encoding, or carrying instructions for execution by the machine 5000 and that cause the machine 5000 to perform any one or more of the techniques of the present disclosure, or that is capable of storing, encoding or carrying data structures used by or associated with such instructions. Non-limiting machine-readable medium examples can include solid-state memories, and optical and magnetic media. Specific examples of machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 5024 can further be transmitted or received over a communications network 5026 using a transmission medium via the network interface device 5020. Network interface device 5020 may connect the machine 5000 to a network of other machines in order to communicate with the other machines in the network by utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 5020 can include one or more physical jacks (e.g., Ethernet, coaxial, or phone jacks) or one or more antennas to connect to the communications network 5026. In an example, and as shown in FIG. 5, the network interface device 5020 can include a plurality of antennas, for example, 5036 and 5040, to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 5000, and includes digital or analog communications signals or other intangible medium to facilitate communication of such software. Machine 5000 may also include Bluetooth controller 5034 which allows the machine to communicate with Bluetooth devices according to Bluetooth standards using frequency hopping spread spectrum communication protocols.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The following are additional examples:

Example 1

A method of channel access by a wireless device in a wireless network comprising: determining whether there is network traffic associated with a preamble of a first type and whether there is network traffic associated with a preamble of a second type, wherein the wireless device is not capable of decoding the preamble of the second type, and wherein determining that there is network traffic associated with a preamble of the second type includes determining that an energy level of the channel is above a predetermined threshold for a first period of time, the first and second preamble types being of different lengths; and sending a packet with a preamble of the first type, responsive to determining that no network traffic is detected associated with the preamble of the second type or network traffic associated with a preamble of the first type for the first period of time.

Example 2

The method of example 1, wherein the wireless network is an Orthogonal Frequency Division Multiplexing wireless network.

Example 3

The method of any one of the previous examples, wherein the first period of time is a Distributed Coordination Function Interframe Space (DIFS) duration.

Example 4

The method of any one of the previous examples, wherein responsive to determining that network traffic is detected associated with the preamble of the second type, entering a sleep mode.

Example 5

The method of any one of examples 1-3, responsive to determining that network traffic is detected associated with the preamble of the second type: determine whether there is network traffic associated with a preamble of the first type and whether there is network traffic associated with a preamble of the second type, and wherein determining that there is network traffic associated with a preamble of the second type includes determining that an energy level of the channel is above a predetermined threshold for a second period of time; and sending the packet responsive to determining that no network traffic is detected associated with the preamble of the second type or network traffic associated with a preamble of the first type for the second period of time, the second period of time being greater than the first period of time.

Example 6

The method of example 5, wherein the second period of time is a DIFS duration plus a backoff duration.

Example 7

The method of any one of the previous examples, wherein the second preamble is associated with an optional low rate physical channel.

Example 8

A wireless device comprising: a medium access control (MAC) layer module configured to: determine whether there is network traffic associated with a preamble of a first type and whether there is network traffic associated with a preamble of a second type on a wireless network, wherein the wireless device is not capable of decoding the preamble of the second type, and wherein determining that there is network traffic associated with a preamble of the second type includes determining that an energy level of a channel of the wireless network is above a predetermined threshold for a first period of time, the first and second preamble types being of different lengths; and send a packet with a preamble of the first type responsive to determining that no network traffic is detected associated with the preamble of the second type or network traffic associated with a preamble of the first type for the first period of time.

Example 9

The wireless device of example 8, wherein the wireless network is an Orthogonal Frequency Division Multiplexing wireless network.

Example 10

The wireless device of any one of the previous examples, wherein the first period of time is a Distributed Coordination Function Interframe Space (DIFS) duration.

Example 11

The wireless device of any one of the previous examples, wherein the MAC layer module is configured to enter a sleep mode responsive to determining that network traffic is detected associated with the preamble of the second type.

Example 12

The wireless device of any one of examples 8-10, wherein the MAC layer module is configured to: determine whether there is network traffic associated with a preamble of the first type and whether there is network traffic associated with a preamble of the second type responsive to determining that network traffic is detected associated with the preamble of the second type, and wherein determining that there is network traffic associated with a preamble of the second type includes determining that an energy level of the channel is above a predetermined threshold for a second period of time; and send the packet using the mobile device, responsive to determining that no network traffic is detected associated with the preamble of the second type or network traffic associated with a preamble of the first type for the second period of time, the second period of time being greater than the first period of time.

Example 13

The wireless device of any one of the previous examples, wherein the second period of time is a DIFS duration plus a backoff duration.

Example 14

The wireless device of any one of the previous examples, wherein the second preamble is associated with an optional low rate physical channel.

Example 15

A machine readable medium that stores instructions which when performed by a machine, cause the machine to perform operations comprising: determining whether there is network traffic associated with a preamble of a first type and whether there is network traffic associated with a preamble of a second type on a wireless network, wherein the machine is not capable of decoding the preamble of the second type, and wherein determining that there is network traffic associated with a preamble of the second type includes determining that an energy level of a channel of the wireless network is above a predetermined threshold for a first period of time, the first and second preamble types being of different lengths; and sending a packet with a preamble of the first type, responsive to determining that no network traffic is detected associated with the preamble of the second type or network traffic associated with a preamble of the first type for the first period of time.

Example 16

The machine-readable medium of example 15, wherein the wireless network is an Orthogonal Frequency Division Multiplexing wireless network.

Example 17

The machine-readable medium of any one of the previous examples, wherein the first period of time is a Distributed Coordination Function Interframe Space (DIFS) duration.

Example 18

The machine-readable medium of any one of the previous examples, wherein the instructions include instructions which when performed by the machine, cause the machine to perform the operations comprising: entering a sleep mode responsive to determining that network traffic is detected associated with the preamble of the second type.

Example 19

The machine-readable medium of any one of examples 15-17, wherein the instructions include instructions which when performed by the machine, cause the machine to perform the operations comprising: determine whether there is network traffic associated with a preamble of the first type and whether there is network traffic associated with a preamble of the second type responsive to determining that network traffic is detected associated with the preamble of the second type, and wherein determining that there is network traffic associated with a preamble of the second type includes determining that an energy level of the channel is above a predetermined threshold for a second period of time; and send the packet responsive to determining that no network traffic is detected associated with the preamble of the second type or network traffic associated with a preamble of the first type for the second period of time, the second period of time being greater than the first period of time.

Example 20

The machine-readable medium of example 19, wherein the second period of time is a DIFS duration plus a backoff duration.

Example 21

The machine-readable medium of any one of the previous examples, wherein the second preamble is associated with an optional low rate physical channel.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method of channel access by a wireless device in a wireless network comprising:
   determining whether there is network traffic associated with a first type of preamble and whether there is network traffic associated with a second type of preamble, wherein the wireless device is not capable of decoding the second type of preamble, and wherein determining that there is network traffic associated with the second type of preamble includes determining that an energy level of the channel is above a predetermined threshold for a first period of time, the first and second types of preambles being of different lengths; and
   transmitting RF signals comprising a packet with the first type of preamble, responsive to determining that no network traffic is detected associated with the second type of preamble or network traffic associated with the first type of preamble for the first period of time.

2. The method of claim 1, wherein the wireless network is an Orthogonal Frequency Division Multiplexing wireless network.

3. The method of claim 1, wherein the first period of time is a Distributed Coordination Function Interframe Space (DIFS) duration.

4. The method of claim 1, wherein responsive to determining that network traffic is detected associated with the second type of preamble, entering a sleep mode.

5. The method of claim 1, responsive to determining that network traffic is detected associated with the second type of preamble:
   determine whether there is network traffic associated with the first type of preamble and whether there is network traffic associated with the second type of preamble, and wherein determining that there is network traffic associated with the second type of preamble includes determining that an energy level of the channel is above a predetermined threshold for a second period of time; and
   sending the packet responsive to determining that no network traffic is detected associated with the second type of preamble or network traffic associated with the first type of preamble for the second period of time, the second period of time being greater than the first period of time.

6. The method of claim 5, wherein the second period of time is a DIFS duration plus a backoff duration.

7. The method of claim 1, wherein the second preamble type is associated with an optional low rate physical channel.

8. A wireless device comprising:
   one or more processors configured to include
   a medium access control (MAC) layer module to:
      determine whether there is network traffic associated with a first type of preamble and whether there is network traffic associated with a second type of preamble on a wireless network, wherein the wireless device is not capable of decoding the second type of preamble, and wherein determining that there is network traffic associated with the second type of preamble includes determining that an energy level of a channel of the wireless network is above a predetermined threshold for a first period of time, the first and second types of preambles being of different lengths; and
   transmit RF signals comprising a packet with the first type of preamble responsive to determining that no network traffic is detected associated with the second type of preamble or network traffic associated with the first type of preamble for the first period of time.

9. The wireless device of claim 8, wherein the wireless network is an Orthogonal Frequency Division Multiplexing wireless network.

10. The wireless device of claim 8, wherein the first period of time is a Distributed Coordination Function Interframe Space (DIFS) duration.

11. The wireless device of claim 8, wherein the MAC layer module is configured to enter a sleep mode responsive to determining that network traffic is detected associated with the second type of preamble.

12. The wireless device of claim 8, wherein the MAC layer module is to:
   determine whether there is network traffic associated with the first type of preamble and whether there is network traffic associated with the second type of preamble responsive to determining that network traffic is detected associated with the second type of preamble, and wherein determining that there is network traffic associated with the second type of preamble includes determining that an energy level of the channel is above a predetermined threshold for a second period of time; and
   transmit RF signals comprising the packet using the wireless device, responsive to determining that no network traffic is detected associated with the second type of preamble or network traffic associated with the first type of preamble for the second period of time, the second period of time being greater than the first period of time.

13. The wireless device of claim 12, wherein the second period of time is a DIFS duration plus a backoff duration.

14. The wireless device of claim 8, wherein the second type of preamble is associated with an optional low rate physical channel.

15. A non-transitory machine readable medium that stores instructions which when performed by a machine, cause the machine to perform operations comprising:
   determining whether there is network traffic associated with a first type of preamble and whether there is network traffic associated with a second type of preamble on a wireless network, wherein the machine is not capable of decoding the the second type of preamble, and wherein determining that there is network traffic associated with the second type of preamble includes determining that an energy level of a channel of the wireless network is above a predetermined threshold for a first period of time, the first and second types of preambles being of different lengths; and sending a packet with the first type of preamble, responsive to determining that no network traffic is detected associated with the second type of preamble or network traffic associated with the first type of preamble for the first period of time.

16. The machine-readable medium of claim 15, wherein the wireless network is an Orthogonal Frequency Division Multiplexing wireless network.

17. The machine-readable medium of claim 15, wherein the first period of time is a Distributed Coordination Function Interframe Space (DIFS) duration.

18. The machine-readable medium of claim 15, wherein the instructions include instructions which when performed by the machine, cause the machine to perform the operations comprising: entering a sleep mode responsive to determining that network traffic is detected associated with the second type of preamble.

19. The machine-readable medium of claim 15, wherein the instructions include instructions which when performed by the machine, cause the machine to perform the operations comprising:

determine whether there is network traffic associated with the first type of preamble and whether there is network traffic associated with the second type of preamble responsive to determining that network traffic is detected associated with the second type of preamble, and wherein determining that there is network traffic associated with the second type of preamble includes determining that an energy level of the channel is above a predetermined threshold for a second period of time; and send the packet responsive to determining that no network traffic is detected associated with the second type of preamble or network traffic associated with the first type of preamble for the second period of time, the second period of time being greater than the first period of time.

20. The machine-readable medium of claim 19, wherein the second period of time is a DIFS duration plus a backoff duration.

21. The machine-readable medium of claim 15, wherein the second type of preamble is associated with an optional low rate physical channel.

* * * * *